United States Patent Office 3,376,329
Patented Apr. 2, 1968

3,376,329
PREPARATION OF DIALKYLTIN OXIDES
Paul Kobetz and Hymin Shapiro, Baton Rouge, La., assignors to Ethyl Corporation, New York, N.Y., a corporation of Virginia
No Drawing. Filed Mar. 31, 1965, Ser. No. 444,370
19 Claims. (Cl. 260—429.7)

ABSTRACT OF THE DISCLOSURE

Tin dialkyls are prepared by reacting an aluminum trialkyl metathetically with an anhydrous stannous salt of a hydrogen halide or of an organic monocarboxylic acid in a mixture of one or more hydrocarbons or polysiloxanes, or both, with a glycol ether. The two-phase product is separated; the dialkyltin-solvent phase is treated for recovery of the dialkyltin, which can then be treated with atmospheric oxygen to yield the corresponding dialkyltin oxide. Such oxides are effective rodenticides and insecticides and are intermediates in the preparation of thermal stabilizers for polyvinyl chloride.

This invention relates to a novel and efficient process for the preparation of alkyltin compounds. More specifically, it relates to an improved method for the preparation of tin dialkyls and dialkyltin oxides.

Heretofore, the alkyltin oxides have been prepared from the tin tetrahalides by reaction with the appropriate Grignard compound in ether or toluene-ether solution to produce the dialkyltin dihalide. This is separated and reacted with caustic alkali to yield the dialkyltin oxide. This process exhibits the usual disadvantages inherent in Grignard syntheses, namely, the handling of large volumes of volatile solvents and the consequent multiplicity of separations.

Accordingly, it is an object of the present invention to provide a simple and efficient process for the preparation of both tin dialkyls and dialkyltin oxides. Another object is to provide a method for the preparation of dialkyltin oxides which is simpler and which involves fewer operations than previously known processes. Still another object is to provide a method for the preparation of dialkyltin compounds which avoids the above-mentioned difficulties. Other objects will appear hereinafter.

Pursuant to this invention, tin dialkyls are efficiently prepared by reacting an aluminum trialkyl metathetically with an anhydrous stannous salt in a solvent comprising a mixture of one or more hydrocarbons, or one or more polysiloxanes, or both, with a glycol ether. The reaction product consists of two phases, one of which consists essentially of a tin dialkyl dissolved in the above-mentioned solvent, and the other, an aluminum salt etherate complex. The first phase is separated and the dialkyltin recovered therefrom, or alternatively, after separation, is treated with atmospheric oxygen or other suitable oxidizing agent to yield the corresponding dialkyltin oxide. This process, therefore, represents an embodiment of the present invention.

The aluminum alkyls employed in the process of this invention may contain from one to forty or more carbon atoms in each alkyl group, but those wherein each alkyl group contains from 1 to about 8 carbon atoms react rapidly and smoothly and are therefore preferred. Of the tin reactants mentioned above, the halides are preferred for reasons of availability and ease of preparation of the pure compounds. Either the tetrahalides or the dihalides of tin may be employed but the use of the former involves a more complicated procedure and additional steps and materials to convert the resulting tetravalent organotin compounds to dialkyltin and dialkyltin oxide. Consequently, the divalent halides are preferred, and of these, stannous chloride is most highly preferred for reasons of economy.

Any of a wide variety of oxidizing agents can be employed as reactants in the second, or oxidizing, stage of the process of this invention. These oxidizing agents may include, among others, air, gaseous oxygen, hydrogen peroxide, alkali metal peroxides, alkaline earth metal peroxides, and organic peroxides. Of these, air has been found to be an effective reactant and, because of its cheapness and availability, is preferred.

As compared with earlier processes, the process of the present invention offers a number of advantages. This process is inherently economical of labor and of materials because the aluminum trialkyl is completely consumed, the reaction being driven essentially to completion by the formation of aluminum salt etherate. The etherate forms a separate lower layer, thus affording an easy separation of the dialkyltin intermediate from the reaction product.

The invention will be more fully understood by reference to the following set of illustrative examples, in which all parts and percentages are by weight.

EXAMPLE I

Two-hundred ml. of dry toluene, 20 ml. of the dimethyl ether of diethylene glycol, and 25 g. of finely divided anhydrous stannous chloride were introduced into a 500-ml. 3-neck flask fitted with a nitrogen purging system, a magnetic stirrer and a dropping funnel containing 25 ml. of tri-n-butylaluminum and 25 ml. of toluene. The flask and contents were heated to 50° C. in an oil bath and the tri-n-butylaluminum solution was added dropwise over a period of 15 minutes, at the end of which reaction was complete. The two phases of which the product consisted were separated. The lower phase (25.2 g.) was heated to reflux and aerated for one hour to precipitate di-n-butyltin oxide. The yield was 25.1 g. or 77 percent of theory. The product was analyzed with the results given below:

Found (percent): Sn, 46.4; C, 35.5; H, 6.92; Al, 0.17; Cl, 0.17. Theory (percent): Sn, 47.5; C, 38.4; H, 7.6; Al, 0; Cl, 0.

When the above experiment is repeated using trimethylaluminum or triisooctylaluminum in place of the tri-n-butyl-aluminum and using anhydrous stannous bromide or anhydrous stannous iodide in place of the stannous chloride, similar results are obtained.

EXAMPLE II

Using the apparatus described in Example I, 25 ml. of triethylaluminum, dissolved in 25 ml. of dry exylene, are added dropwise to a mixture of 25 g. of finely divided anhydrous stannous chloride, 20 ml. of the dimethyl ether of diethylene glycol, and 50 ml. of dry xylene. After reaction is completed by heating, as in Example I above, the product phases are separated; the lower phase is distilled under a reduced pressure of dry nitrogen to remove the xylene. The residual yellow oil is diethyltin of a high degree of purity.

When the procedure of Example II is repeated, using tri-n-butylaluminum or triisoamylaluminum in place of the diethylaluminum, similar results are obtained. Moreover, when the xylene called for in that procedure is replaced by n-hexane, 2,2,3-trimethylbutane, 2,2,4-trimethylpentane, n-dodecane, n-cetane, toluene, cumene, mesitylene, or a liquid siloxane, similar results are obtained.

EXAMPLE III

Air is bubbled for a period of 1 hour through a solution of the yellow oily product of Example II in dry n-octane. Diethyltin oxide is precipitated as an insoluble polymer, separated by filtration and washed with pure n-octane.

The air employed for oxidation in Example III can be replaced by pure oxygen or by oxygen diluted with an inert gas, such as nitrogen, helium, neon, argon, krypton, or xenon or with a mixture of such inert gases. Results similar to those of Example III are then obtained.

EXAMPLE IV

Thrity-nine g. of tin tetrachloride are added to a mixture of 200 ml. of toluene and 200 ml. of the dimethyl ether of diethylene glycol. A solution of 25 ml. of tri-n-butylaluminum in 25 ml. of toluene is added dropwise over a 15-minute period. The resulting solution is then heated to reflux for one-half hour, after which it is cooled to room temperature. A separate phase consisting essentially of the aluminum chloride etherate complex is formed during the reaction. The toluene phase, containing the di-n-butyl tin dichloride intermediate, is now reacted with 100 ml. of 10 percent aqueous sodium hydroxide. Di-n-butyl tin oxide precipitates at once and is separated and weighed. An excellent yield of product is obtained.

When the procedure of the foregoing example is repeated, using tin tetrabromide instead of tin tetrachloride and triethylaluminum in place of tri-n-butylaluminum, similar results are obtained.

EXAMPLE V

Thirty-five and four-tenths g. of anhydrous stannous acetate are added to a mixture of 200 ml. of toluene and 15 ml. of the dimethyl ether of diethylene glycol. A solution of 25 ml. of tri-n-butylaluminum in 25 ml. of toluene is added dropwise, over a 30-minute period. A separate phase consisting essentially of the aluminum acetate-etherate complex is formed during the reaction. The upper toluene phase containing di-n-butyl tin is oxidized with air. A good yield of dibutyltin oxide is obtained.

When the procedure of the foregoing example is repeated, using stannous propionate, stannous butyrate, stannous caproate or stannous caprate instead of stannous acetate, similar results are obtained.

The trialkylaluminum reactant of this invention may contain from 1 to 40 or more carbon atoms per alkyl group. For reasons of availability and ease of preparation, those containing from 1 to about 8 carbon atoms per alkyl group are preferred. These reactants are exemplified by trimethylaluminum, tri-n-propylaluminum, tri-isoamylaluminum, tri-n-octylaluminum, tri-n-decylaluminum, tri-n-dodecylaluminum, tricetylaluminum, trieicosylaluminum, tri-n-triacontylaluminum and tri-n-tetracontylaluminum. Mixed aluminum alkyls containing two or more different alkyl radicals can also be used.

The tin salt reactants include the stannous and stannic halides, namely, the fluorides, chlorides, bromides and iodides of divalent and tetravalent tin. Also included are the statnnous salts of saturated aliphatic monocarboxylic acids. Examples of these acids are acetic, propionic, n-butyric, isobutyric, valeric, caproic, capyrlic, capric, dodecanoic and hexadecanoic acids. The oxidizing agents of this invention include air, pure gaseous oxygen, oxygen diluted with such inert gases as nitrogen, helium, neon, argon, krypton and xenon, hydrogen peroxide, lithium perodixed, sodium peroxide, potassium peroxide, rubidium peroxide, cesium peroxide, magnesium peroxide, calcium peroxide, strontium peroxide, barium peroxide and organic peroxides such as benzoyl peroxide, dibutyl peroxide, acetyl peroxide and tetrahydraofuran hydroperoxide.

In the reaction of the trialkylaluminum with the tin salt, the relative proportions of the reactants may vary from a 100% or greater excess of the former to a 100% or greater excess of the latter. Approximately stoichiometric proportions are normally preferred since the use of such proportions simplifies recovery problems. In the oxidation step, a large excess, of the order of 100%, of the oxidizing agent is normally employed since such excess favors rapid completion of the oxidation reaction.

Reaction temperatures in the present process are not at all critical. In fact, any temperature between —20° C. or below and the reflux temperature of the solvent employed is satisfactory; for ease of operation, temperatures in the neighborhood of ambient temperature, for example, from 15° to 50° C., are preferred.

The pressures herein may range from atmospheric or below to 10 atmospheres or above. For simplicity of operation, atmospheric pressure is preferred. In any case, the pressure-producing atmosphere should be inert with respect to reactants and products. Suitable atmospheres include saturated aliphatic hydrocarbons which are gaseous under the reaction conditions, carbon monoxide, hydrogen, nitrogen, helium, neon, argon, krypton, xenon and mixtures of the foregoing.

A wide variety of solvents may be employed to form the solvent mixture of the present invention. The principal requirement is that they be mutually soluble, but that the aluminum salt-ether complex produced in the reaction be insoluble in the solvent mixture. The combination of any liquid glycol ether with any liquid hydrocarbon or polysiloxane provides a suitable solvent. Of the glycol ether components, the dialkyl ethers of the dialkylene glycols are preferred because of their high solvent capacity for the organometallic reactants; the dimethylether of diethylene glycol is particularly preferred because of its availability and economy. Other suitable glycol ether solvents include dimethoxyethane, triethylene glycol dimethyl ether and tetraethylene glycol di-n-butyl ether.

Of the hydrocarbons, the lower liquid aliphatic and aromatic hydrocarbons are preferred because of their high solvent power for the organometallic reactants, and of these, toluene and xylene are particularly preferred because of their accessibility and economy. Other suitable hydrocarbon solvents include hexane, isooctane, n-decane, cetane, petroleum naphtha, white oil, benzene, cumene and mesitylene.

Of the polysiloxanes, any may be employed which are liquid under the reaction conditions. The lower polysiloxanes and their mixtures are preferred because of their high solvent capacity for the organometallic reactants of the invention, and of these, methyl silicone oil is preferred because of its availability and economy. Other suitable polysiloxanes may be found in Rochow: "An Introduction to the Chemistry of the Silicones," New York, John Wiley and Sons, Inc., 2nd edition, 1951, pages 184–186.

The order of addition of the reactants is not important, i.e., the organoaluminum compound can be added to the tin compound or conversely. However, since the organoaluminum compound is in liquid phase and the tin compound is a solid, the addition of the former to the latter can be more readily controlled and is therefore preferred.

The reaction period can range from less than one minute to 6 hours or more depending upon the reaction temperature and the nature of the reactants. Other things being equal, the introduction of alkyl substituent into, or the lengthening of alkyl chains in, the reactants tends to reduce the reaction rate and increase the needed reaction time. The permissible rate of reactant addition is a function of the reflux capacity of the reactor and is limited by that capacity. Within that limit, any desired rate of addition may be employed.

The products of this invention are of utility in a number of applications. They are effective rodenticides and insecticides and are useful intermediates in the preparation of thermal stabilizers for polyvinyl chloride.

We claim:
1. In the process for the preparation of a dialkyltin which comprises reacting an aluminum trialkyl metathetically with a substantially stiochiometrically equivalent quantity of a tin compound selected from the group consisting of anhydrous stannous halides and anhydrous stannous salts of organic monocarboxylic acids, the reaction being carried out under an atmosphere inert to both reactants and products, the improvement in accordance with which the aluminum salt co-product is separated from the dialkyltin product by carrying out said reaction in a solvent comprising a mixture of a first component selected from the group consisting of hydrocarbons and polysiloxanes with a second component consisting of a glycol ether, both of said components being liquid under the reaction conditions, to produce a two-phase reaction product consisting essentially of a tin dialkyl dissolved in said solvent comprising the first phase and an aluminum salt-etherate complex comprising the second phase, the quantity of said glycol ether being substantially that required to form a complex with said aluminum salt and to hold said complex in solution when formed, separating said first phase, and recovering said dialkyltin therefrom.

2. The process of claim 1 wherein each alkyl group of said aluminum trialkyl contains from 1 to about 8 carbon atoms.

3. The process of claim 1 wherein said aluminum trialkyl is tri-n-butylaluminum.

4. The process of claim 1 wherein said tin compound is stannous chloride.

5. The process of claim 1 wherein said first component is selected from the group consisting of individual hydrocarbons and mixtures of hydrocarbons.

6. The process of claim 1 wherein said first component is toluene and said glycol ether is the dimethyl ether of diethylene glycol.

7. In the process for the preparation of a dialkyltin oxide which comprises reacting an aluminum trialkyl metathetically with a substantially stoichiometrically equivalent quantity of a tin compound selected from the group consisting of anhydrous stannous halides and anhydrous stannous salts of organic monocarboxylic acids, under an atmosphere inert with respect to both reactants and products, to yield a dialkyltin product, separating and oxidizing said dialkyltin product with an oxidizing agent selected from the group consisting of air, gaseous oxygen, hydrogen peroxide, alkali metal peroxides, to form an oxidation product containing dialkyltin oxide, and separating said dialkyltin oxide from said oxidation product, the improvement which comprises separating the aluminum salt co-product from said dialkyltin product, by carrying out the metathesis in a solvent comprising a mixture of a first component selected from the group consisting of hydrocarbons and polysiloxanes with a second component consisting of a glycol ether, both of said components being liquid under the reaction conditions, to yield a two-phase reaction product consisting essentially of a tin dialkyl dissolved in said solvent comprising the first phase and an aluminum salt-etherate complex comprising the second phase, the quantity of said glycol ether being substantially that required to form a complex with said aluminum salt and to hold said complex in solution when formed, separating said first phase, and recovering said dialkyltin product therefrom.

8. The process of claim 7 wherein each alkyl group of said aluminum trialkyl contains from 1 to about 8 carbon atoms.

9. The process of claim 7 wherein said aluminum trialkyl is tri-n-butylaluminum.

10. The process of claim 7 wherein said tin compound is stannous chloride.

11. The process of claim 7 wherein said tin compound is stannous acetate.

12. The process of claim 7 wherein said first component is selected from the group consisting of hydrocarbons and mixtures of hydrocarbons.

13. The process of claim 7 wherein said first component is toluene.

14. The process of claim 7 wherein said glycol ether is the dimethyl ether of diethylene glycol.

15. The process of claim 7 wherein said oxidizing agent is air.

16. The process of claim 7 wherein both the metathesis and the oxidation reaction are carried out at temperatures between —20° C. and the reflux temperature of said solvent under ambient pressure.

17. The process of claim 7 wherein both the metathesis and the oxidation reaction are carried out at about the reflux temperature of said solvent under ambient pressure.

18. The process of claim 7 wherein said atmosphere is selected from the group consisting of a saturated aliphatic hydrocarbon gaseous under the reaction conditions, carbon monoxide, hydrogen, nitrogen, helium, neon, argon, krypton, xenon and mixtures thereof.

19. The process of claim 7 wherein said atmosphere is nitrogen.

References Cited

UNITED STATES PATENTS 3,287,386  11/1966  Neuman _____ 260—429.7

TOBIAS E. LEVOW, *Primary Examiner.*

W. F. W. BELLAMY, *Assistant Examiner.*